United States Patent [19]

Van Eck

[11] Patent Number: 4,669,117
[45] Date of Patent: May 26, 1987

[54] VIDEO TERMINAL WITH IMAGE LINE DISARRANGEMENT

[75] Inventor: Willem Van Eck, Leiden, Netherlands

[73] Assignee: Staat Der Nederlanden (Staatsbedrijf Der Posterijen, Telegrafie en Telefonie), The Hague, Netherlands

[21] Appl. No.: 745,573

[22] Filed: Jun. 17, 1985

[30] Foreign Application Priority Data

Jun. 22, 1984 [NL] Netherlands ............................ 8401989

[51] Int. Cl.⁴ ........................ H04N 7/167; H04N 1/44; H04N 7/01
[52] U.S. Cl. .......................................... 380/14; 380/18; 358/140
[58] Field of Search ................ 358/119, 259, 263, 140

[56] References Cited
U.S. PATENT DOCUMENTS

Re. 31,460  12/1983  Dalton et al. ...................... 358/140
2,879,324   3/1959   Hoffman et al. .................... 358/119
3,958,077   5/1976   Ross et al. ........................ 358/119 X
4,405,942   9/1983   Block et al. ....................... 358/119
4,459,611   7/1984   Arai et al. ........................ 358/259 X
4,553,171  11/1985   Holladay et al. ................... 358/263

FOREIGN PATENT DOCUMENTS 2486746  1/1982  France .
1590579  6/1981  United Kingdom ................ 358/119

Primary Examiner—Stephen C. Buczinski
Assistant Examiner—Linda J. Wallace
Attorney, Agent, or Firm—Frishauf, Holtz, Goodman & Woodward

[57] ABSTRACT

Video terminal comprising electronic circuit provisions due to which the user of this terminal is protected against unwanted "remote looking-in" by other persons at the information reproduced on his screen. For that purpose the sequence in which the image lines are reproduced on the screen, is pseudo-randomly disarranged.

4 Claims, 4 Drawing Figures

FIG.2

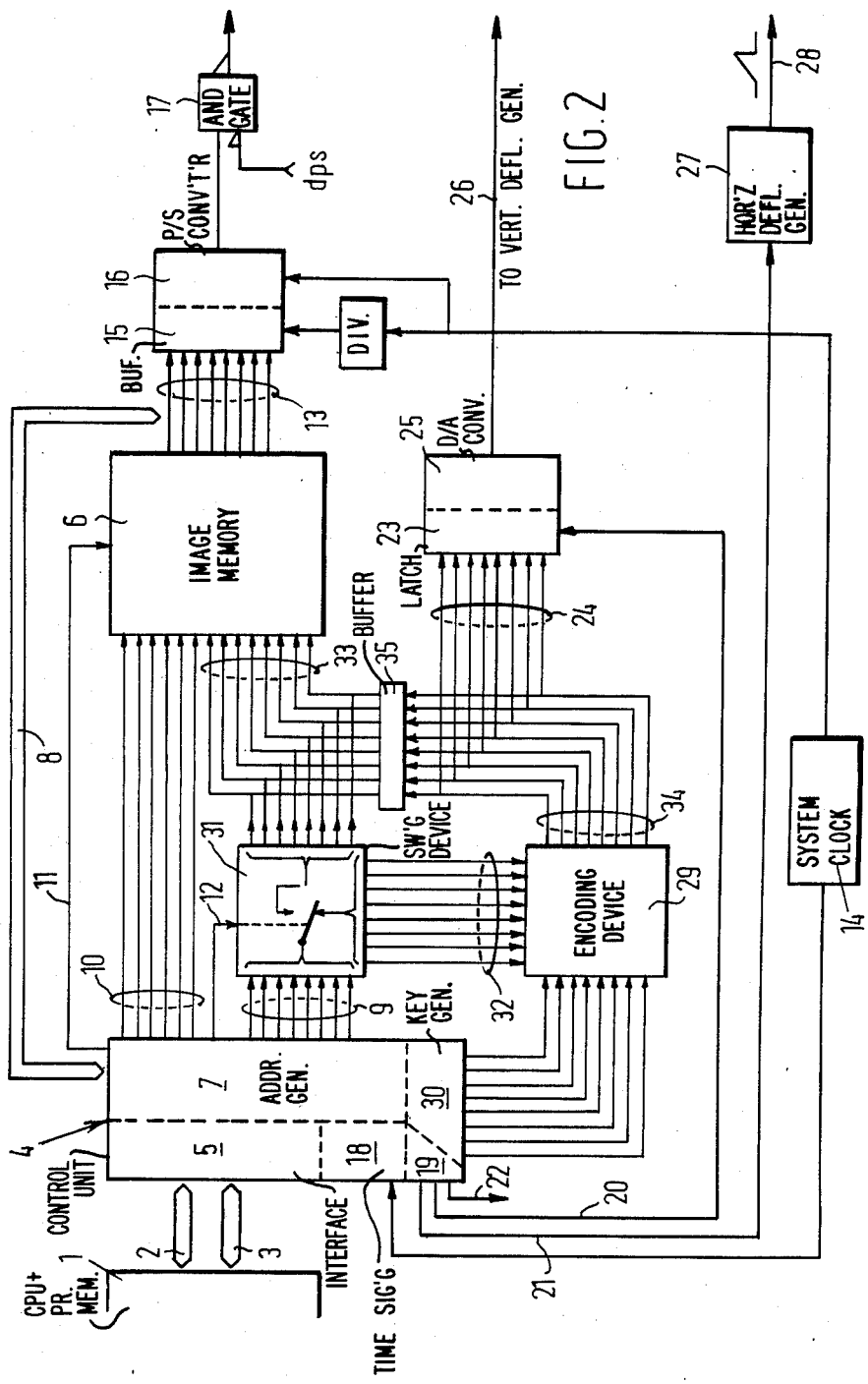

VIDEO TERMINAL WITH IMAGE LINE DISARRANGEMENT

BACKGROUND OF THE INVENTION

1. Field of the Invention

The invention relates to video terminals which are adapted inter alia to reproduce, starting from digital electrical video signals, incoming or outgoing information in the form of a two-dimensional image which is composed of characters or symbols.

2. State of the Art

Known designs of video terminals are generally provided with a reproducing unit comprising a screen, which unit reproduces, via the screen, a two-dimensional image consisting of a frame pattern of image lines; with a central processing unit with an associated program store; with an image store for the freely addressable reading in and out of image information; and with a control unit for controlling the access to the image store, for generating image store address combinations, each provided with an address part due to which the contents for an image line are determined, and for addressing the screen. Video signals which have the form of digital bit-patterns and which have to be processed by such video terminals, are supplied to the reproducing unit via a video output stage. The electromagnetic fields which are i.a. caused by the amplification of such digital video signals, are of such a strength that under certain circumstances it will be possible to receive these signals with a normal TV receiver and a suitable aerial, and to reconstruct the image from the received signal at a distance of abt. 800 m from the "radiating" terminal in question. Such a radiation is generated in video terminals as well as in normal TV receivers capable of receiving Videotex signals.

Now there is a need to exclude any person other than the user of a video terminal or Viditel receiver from making use of said radiation to take, in an illicit way, cognizance of the information reproduced on the screen of such a terminal or Viditel receiver.

There are known proposals to restrict the radiation of a video terminal by making use of an electromagnetic shield installed around the terminal, as well as of provisions made to filter all the cables that pass through the wall of the casing of the terminal. A solution of this kind is unattractive from a technical-economical point of view.

The object of the present invention is to provide relatively cheap provisions which are simple from a technical point of view and due to which a user of a video terminal will be protected against illicit "looking in" by other persons at the information reproduced on his screen.

SUMMARY OF THE INVENTION

The present invention is based on the insight to disarrange (to encrypt) in a pseudo-random way the sequence in which the image lines are reproduced on the screen. For that purpose a video terminal according to the invention is characterized by encoding means suited to transform the address combination, which is provided by the central processing unit to address the image store, to another, pseudo-random address combination under the condition that this address combination is unequal to the one provided. For a video receiver thus located within the radiation field of a terminal thus adapted the realization of technical provisions ordering the radiation received in such a way that recognizable information is reproduced on the screen of said receiver, will be strongly hindered.

SHORT DESCRIPTION OF THE DRAWING

With reference to the accompanying drawing the invention will be explained in what follows. In this drawing shows:

FIG. 1 by way of illustration an example of the build-up of part of two lines of text on the screen of a video terminal;

FIG. 2 a diagram of a video terminal of a one sort, and in which the invention has been utilized;

FIG. 3 a diagram of an alternative embodiment of a video terminal of the sort represented in FIG. 2; and FIG. 4 a diagram of a video terminal of another sort, and in which the invention has been utilized.

REFERENCE

Memorandum 963 TM

"HF-radiation of video terminals" author: Ir. W. van Eck.

DESCRIPTION OF THE EMBODIMENTS OF THE INVENTION

Figure 1:
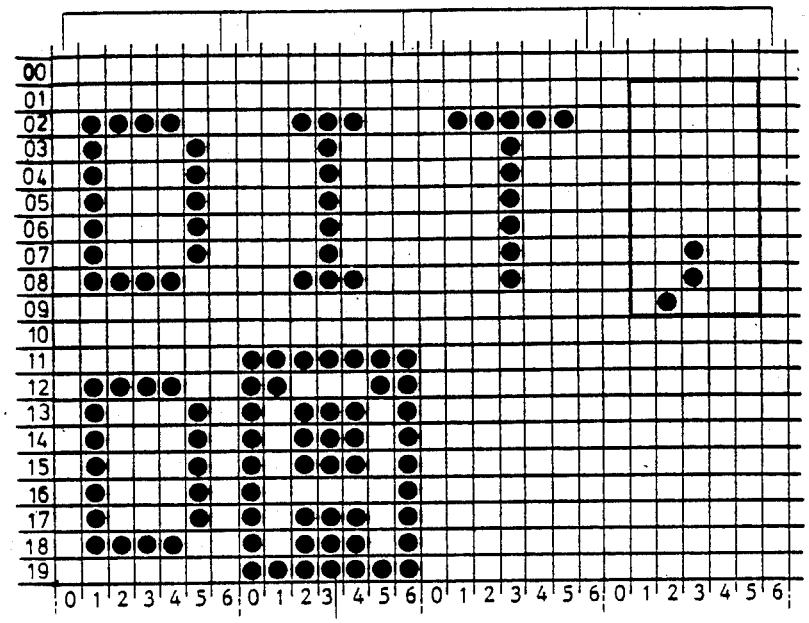

The image reproduced on the screen of a video terminal, which image often consists of a number of lines of characters or symbols, is made up of image dots, the so-called "pixels". Such pixels are arranged in a matrix configuration formed by "horizontal" lines or rows, and "vertical" columns. Part of this matrix configuration is shown in FIG. 1. Such a matrix configuration is determined by the scanning pattern of the electron beam in the cathode-ray tube (CRT) on the screen, and the modulation of the current of this beam, which determines the position of the individual pixels in each image line. In such a case it is usual to compose a character of pixels within a "character matrix" of e.g. $9 \times 5$ pixels, to which two columns and a row have been added in view of the required spacing. In order to reproduce a character on the screen in this way, at least eight consecutive lines, each with a bit pattern of at least five bits, characterizing for the relevant character, have to be "written" on the screen, if it is assumed that the character in question has a height and width corresponding to eight and five lines or bits, respectively.

FIG. 1 shows part of two "lines" of text, the upper line, defined by ten lines 00–09, of which containing three characters, and the line (ten lines 10–19) under it containing a character and a so-called cursor. For reproducing such characters, a circuit forming part of the video terminal, produces a digital video signal, which is amplified by an output stage also incorporated in the video terminal. The digital signal thus formed consists of series of serial bit patterns each containing n-bits (n being the number of bits or pixels corresponding to the "width" of a character to be reproduced), the control unit also forming part of the terminal supplying the deflection signals needed for the deflection, according to a line frame, of the beam on the screen. In fact the amplified video signal supplied by such a video output stage consists of series of pulses with a width of e.g. 45,438 ns and short transition times. Now it appears that a like video signal causes an interfering radiation with such frequencies and field strengths that an image reproduced on the screen of the video terminal in question by such a video signal can be reconstructed to a clearly recognizable copy of that image in a remotely located normal TV receiver. To make such a reconstruction very difficult or even impossible it is, according to the invention, proposed to disarrange the sequence in which the lines containing character characterizing bit patterns are written on the screen, with due observance of certain restrictive conditions. For the sake of simplicity the sequence of the columns, i.e. the sequence in which the characters of a line are reproduced, is maintained when the process in the video terminal takes place. The encoding to be used for the aforesaid disarrangement or encryption depends on the sort of video terminal in which such an encryption has to take place. With a one sort of video terminal the image store forming part of the same is arranged on the basis of the arrangement of the image dots on the screen. This store is addressed by means of two address combinations; one address combination renders it possible to address the information in a line on the screen as a whole (line address bus); the other address combination offers the possibility to address the information in each group of n (store depth) image dots in the line indicated (column address bus), n indicating the number of pixels reserved for a character in each image line. Such an image store is, by way of example, designed with 256 store lines, 64 store columns and a depth of 8 bits. For the addressing of a character position an image store thus constructed requires a number of eight line address leads and a number of six column address leads, allowing the possibility of reading out in a parallel form each addressed character position via eight output leads. A video terminal designed with an image store thus arranged is diagrammatically shown in FIG. 2, in which 1 designates a central processing unit including an associated programme store for controlling and carrying out in their totality the methods for processing the information signals entering the terminal and leaving it. This processing unit 1 is coupled, via two communication channels 2 and 3, to a control unit which is in its generality indicated by 4. More in particular the channels 2 and 3 (for the exchange of data and the exchange of status information) are coupled to an interface 5, forming part of the control unit 4. The image store, which is described above, is designated by 6. An important function performed by the control unit 4 concerns the access control and the addressing for the image store, which is diagrammatically indicated by 7 (address generator) in FIG. 2. This address generator is adapted to generate during the reading-in process as well as during the reading-out process store line and store column addresses, as a result of orders given by the processing unit, allowing the possibility of indirect communication, via a separate 8-bit data bus 8, between the processing unit 1 and the eight input/output leads of the image store 6, for when information has to be read in into the image store 6, this information will be supplied, via said data bus and the eight leads on the right-hand side of this store, into the store positions indicated via the address leads. In this case the eight leads act as input leads. During the reading-out process of this image store these eight leads, however, act as output leads. Said address generator 7 comprises, at least for the embodiment of the image store 6 described above, eight store line address leads 9, six store column address leads 10, a read/write output 11 via which a reading-in or reading-out working for the image store 6 can be controlled, and a switch signal output 12, which will be further explained in what follows. The eight input/output leads 13 of the image store 6 are coupled to a parallel-series converter 16 via a buffer 15, which is controlled by the system clock 14. At the output 17 of said converter a serial bit pattern is delivered for each addressed character position of the image store 6, which bit pattern is the digital video signal, which, after having been gated in the logical AND-gate 17, which is controlled by the blanking signal (dps), has to be reproduced on the screen on the image line corresponding to the relevant store line address, and in the image column corresponding to the relevant store column address. For the sake of completeness it is remarked that the control unit 4 is further provided with a time signalling part 18, which, controlled by the system clock 14, ensures the internal time signalling, and with a cathode-ray tube control unit 19, which ensures the image line addressing (vertical deflection), the image dot addressing (horizontal deflection) and the blanking signal (image line-frame exchange) via the outputs 20, 21 and 22. For that purpose the vertical synchronization signals of the output 20 are active to discharge a latch circuit 23 (8-bit store element), so that a digitalized screen line address fed in in a parallel form via the eight address leads 24 will be supplied to the digital-to-analog converter 25. This converter 25 forms from the relevant digital screen line address a voltage corresponding to the same at the output 26, due to which the vertical deflection on the screen is thus arranged that the beam will write an image line indicated by the address, which is effected under the control of the horizontal synchronization signals coming from the output 21, which every time achieve that a line generator 27 delivers at its output 28 the deflection voltage needed for the horizontal beam deflection.

With video terminals of the conventional type the digital video signals are delivered at the output of the gate 17 in a "natural" sequence, so that the signals will be reproduced on the screen line by line and dot by dot in accordance with the conventional analog TV technique. The power spectral density (frequency spectrum) of such digital video signals is relatively large up to frequencies up into the UHF region. Considered in the frequency spectrum, the video signal is modulated in amplitude in the vicinity of all the harmonics of the fundamental frequency. This fundamental frequency involves relatively high frequencies, which are radiated by the aerial working of printed circuits and components (including the electron beam of the cathode-ray tube) in the video terminal. Now it has appeared that if the energy content is such that such a radiation can be received by a wide band receiver (normal TV receiver) at a distance from the terminal, simple envelope detection and acquaintance with the "natural" sequence (standard pattern) in which the image is written on the screen, will lead to the possibility to reconstruct the image from the radiation. In order to make such illicit copying of the information reproduced on the screen difficult or practically impossible, it is, according to the invention, proposed to change the standard pattern according to which the image store is read out. This can be achieved with a video terminal of the sort described in view of FIG. 2 by making the sequence in which the image store 6 is read out deviate from the sequence in which the store line addresses are supplied via the leads 9. To that end an encoding device 29, a code key generator 30 and a controllable switching device 31 are utilized. Under the control of the switch signal at the output 12 the line address leads 9 can be connected, via the two-position switching device 31, at choice either to the input 32 of the encoding device 29 or to the store line address input 33 of the image store 6. The output 34 (eight leads) of the encoding device 29 is connected, via a buffer 35, to said input 33 as well as to the eight address leads 24, which are connected to the latch circuit 23. Owing to this buffer it is prevented that during the reading-in process of the image store 6 the line address information then supplied will also be supplied to the input of the latch circuit 23. Now the encoding device 29 has been adapted in such a way that, dependent on an encryption algorithm introduced by the generator 30, an address $a_i$ supplied at the input 32 will be changed into another address $a_u$. In this case the algorithm has to satisfy the conditions that: $a_i \neq a_u$; $a_u \leq (y-1)$, in which y represents the number of screen lines which form the image to be reproduced on the screen; and that there has to be an unambiguous relation between $a_i$ and $a_u$, in other words, to one value of $a_u$ belongs one and no more than one value of $a_i$.

To intensify the encryption process the control unit 4 can be adapted to effect that the algorithm determined by the generator 30 will be changed periodically, e.g. after time intervals each corresponding to a chosen number of image frames.

The system described above can be adapted in such a way that in response to a read command signal via the output 12 the switching device 31 will be switched in such a way that the leads 9 will be connected to the input 32 of the encoding device 29. In consequence of this it is achieved that the image store 6 will be read out in a line sequence which deviates from the line sequence indicated by the control unit 4. Via the output 34 a store line is pseudo-randomly chosen on the basis of the encryption algorithm introduced, causing at the same time an appropriate vertical deflecting voltage via the leads 24 and the converter 25. Since the encoding device 29 works within the aforesaid conditions of the encryption algorithm, all the screen lines, be it in a pseudo-random sequence, will finally get their turn with the build-up of an image to be reproduced on the screen.

The control unit 4 is further adapted to achieve that the image content will be changed if necessary, because of the fact that during the time interval between two image frames the image store 6 is read in, the switching device 31 being switched in such a way that the leads 9 will be directly connected to the address input 33.

Figure 3:
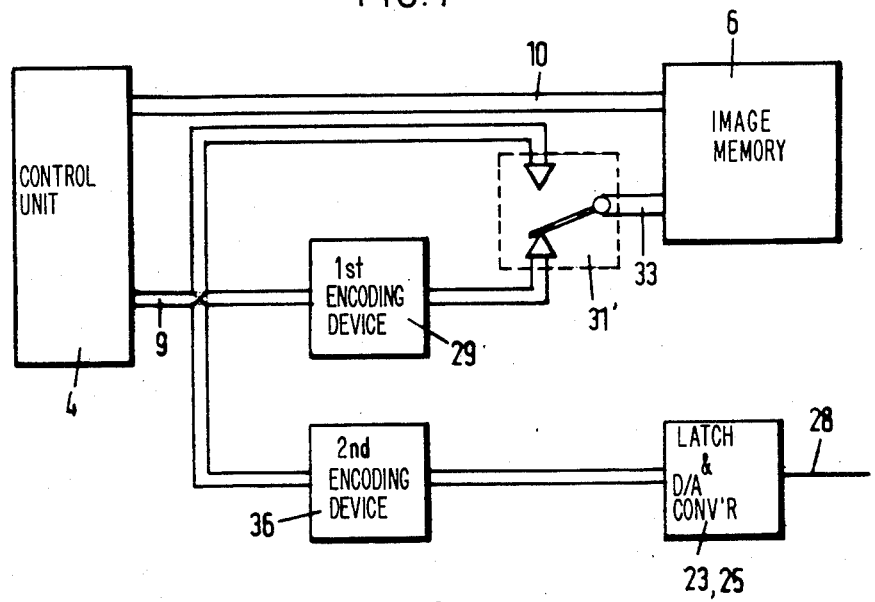

A variant of the device according to FIG. 2 is shown in FIG. 3. In this alternative embodiment the encoding device 29, is during the reading-in process of the image store 6, via a switching device 31' inserted between the screen line address leads 9 and the screen line address input 33 of this image store. These screen line address leads 9 are at the same time connected, via an additional encoding device 36, to a latch circuit, such as 23, and an associated digital-to-analog converter, such as 25. At variance with the embodiment according to FIG. 2 an address Y supplied via the control device 4, is in the embodiment according to FIG. 3 converted during the reading-in process into another store line address X via the encoding device 29, so that the information belonging to this address Y will be read in under the store line address X. In this way it is achieved that the image information disarranged line by line will be recorded in the image store. During the reading-out process the switching device 31' is changed over from the position shown in FIG. 3, so that the screen line address supplied by the control unit 4 will be directly delivered to the image store 6. This means that a store line X is indicated every time during the reading-out process, in which store line during the reading-in process and dependent on the encryption algorithm used, e.g. the information belonging to the line address Y, which was supplied by the control device 4 via the leads 9 during the reading-in process, was stored. Starting from a screen line address, such as X, supplied during the reading-out process, the additional encoding device 36 now serves to indicate that line of the screen where the information stored in the image store 6 as belonging to an address Y supplied, has to be recorded. To that end this additional encoding device 36 develops at its output a voltage due to which the vertical deflection on the screen is adjusted to the screen line referred to above via the latch circuit 23 and the converter 25. In other words, when the encoding device 29 is adapted to convert an address Y supplied to it into a store line address X, the algorithm of the additional encoding device 36 has to be such that the inverse of the algorithm of the encoding device 29, so to speak, will be carried out so that, starting from an address X supplied, the (screen) line address Y will be generated. It appears that often the same algorithm can be used for the two encoding devices 29 and 36, in other words, these encoding devices can often have the same structure.

Figure 4:
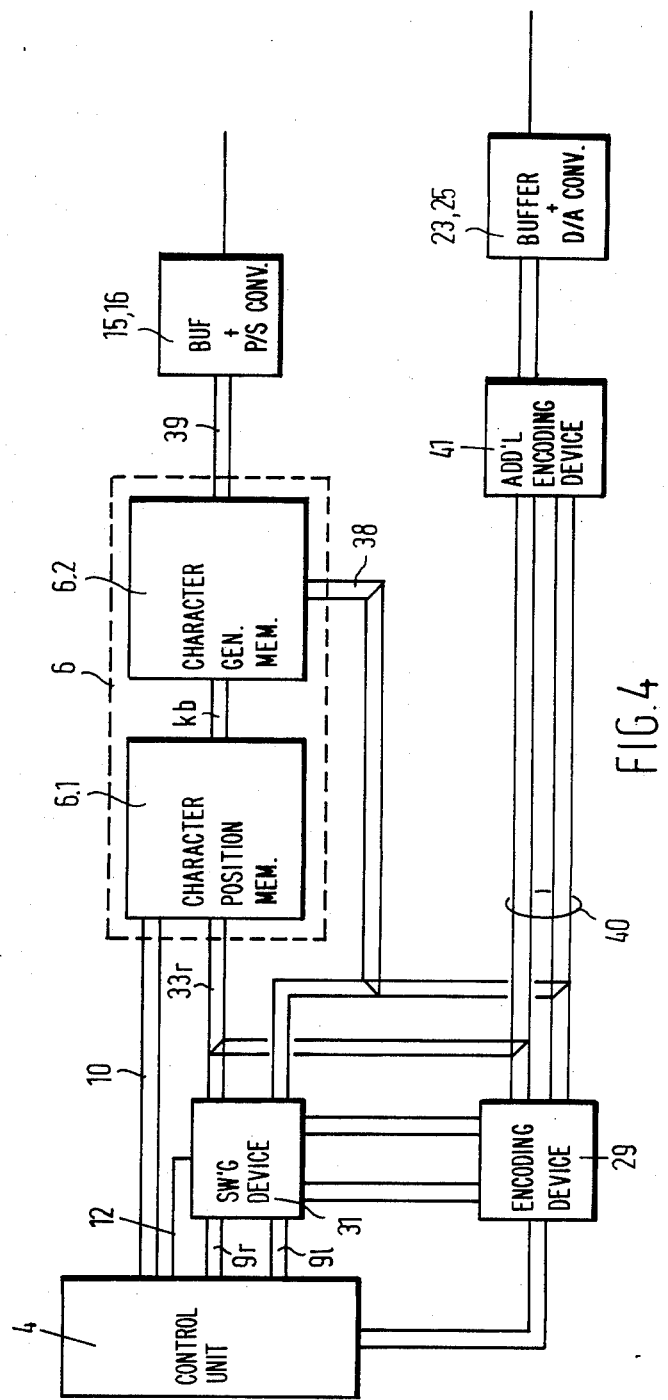

FIG. 4 shows a simplified block diagram of a video terminal of the sort with which, at variance with the system described above, the addressing of the characters is carried out in two stages, and in which the invention is utilized. Components having a similar counterpart in the embodiments according to FIG. 2 or 3, have been designated by the same reference numerals.

Illustrative of a video terminal of the sort shown in FIG. 4 is that the screen is divided according to a visual matrix pattern of lines and columns, each line comprising a given number of image lines. Thus the position of each character to be reproduced on the screen is determined by a text line address and an image column address, whereas the image content of such a character position is determined by the image line addresses for the image text line indicated. Such an addressing diagram involves that the image store 6 is composed of a character position part 6.1 and a character generator part 6.2. The part 6.1, which is preferably designed as a freely accessible store the depth (e.g. a depth of 8 bits) of which has been chosen on the basis of the number of code bits needed to reproduce from the various characters a relevant one, is addressed via a character text line bus 33r and a character column bus 10. For example the buses 33r and 10 are composed of five and six address leads, respectively, so that a number of R=32 different lines and K=64 different columns, respectively will be defined. This store part 6.1 is coupled via a data bus kb to the character generator 6.2. Via this data bus kb a code, e.g. ascii, is supplied, due to which a character to be supplied by the character generator 6.2 will be indicated. Via a screen line address bus 38 (composed of e.g. L=4 leads, so that 16 image lines can be indicated) the character generator 6.2 receives the relevant image line addresses, in which the bit patterns supplied at the output bus 39, which bit patterns are characterizing for the character indicated via the data bus, have to be recorded in the addressed column.

According to the invention the text line and screen line addresses, which are supplied by the control unit 4 via the text line bus gr and the screen line bus gl, respectively are encrypted by the encoding device 29, the output of which is, in the embodiment shown in the figure, operationally coupled, during the reading-out process of the image store 6, to the text line bus 33r and the screen line bus 38, respectively, which gives access to the store part 6.1 and the store part 6.2, respectively. The text line address $r_i$ and the screen line address $l_i$ supplied to this encoding device 29 will be encrypted to a text line address $r_u$ and a screen line address $l_u$, respectively developed (encoded) at the output, in which case the encoding algorithm has to satisfy the condition that $r_i \neq r_u$ and $l_i \neq l_u$. If it is further assumed that the image to be reproduced on the screen consists of a number of Kb (e.g. 64) columns, numbered 0 up to and including (x−1), a number of Rb (e.g. 24) lines, numbered 0 up to and including (y−1), each line consisting of a number of Z lines, numbered 0 up to and including (z−1), the additional conditions that have to be satisfied by the encoding algorithm needed for the encryption, can be described as follows:

$r_u$ has to be smaller than (y−1), and
$l_u$ has to be smaller than (z−1), if the address combination $r_i$, $l_i$ supplied consists of components $r_i$ and $l_i$, respectively, which are each smaller than (y−1) and (z−1), respectively, in other words:

$r_u \leq (y-1) \wedge l_u \leq (z-1)$ if it applies that
$r_i \leq (y-1) \wedge l_i \leq (z-1)$.

Moreover, each combination ($r_u$, $l_u$) to which the above applies, has to be arisen from one and no more than one combination ($r_i$, $l_i$), i.e. the conversion converting the components of the set $r_i$, $l_i$ into $r_u$, $l_u$, has to be unambiguous within the field limited by the former conditions.

With a video terminal of the sort shown in FIG. 4 it is necessary to apply a further conversion to the address combinations $r_u$, $l_u$ supplied at the output of the encoding device. For that purpose the output bus 40 of the encoding device 29 (composed e.g. of five and six leads for the text line and screen line addressing, respectively) is also connected to an additional encoding device 41. The encoding algorithm introduced by that is such that an address combination $r_u$, $l_u$ supplied will be converted into an equivalent value G for which it applies that $G = r_u*(z-1) + l_u$. The binary equivalent of this value is converted into a corresponding control voltage by the buffer-digital-analog-converter-combination 23, 25, due to which the vertical deflection on the screen is adjusted in such a way that the right image line will be written on the screen. In this case measures have been taken so that if the number 0 or 232 is supplied, the upper line or, counted from the top, the 233 rd image line considered will be written, and if $G = (y-1)*(z-1)$ is supplied, the lower image line will be written.

The embodiments described above are only meant to illustrate the invention. Numerous variants are possible without leaving the scope of the invention. The encryption algorithm can be integrated e.g. into the control unit such as 4.

Moreover, the invention can be utilized in systems in which the image lines are not indicated via analog voltages, but via digital address signals (e.g. in the case of a flat liquid crystal display (LCD) screen). When utilized in that way the digital-to-analog converter, such as 25, can be dispensed with.

I claim:

1. A video terminal for displaying information in a manner defeating eavesdropping by nearby display apparatus using a standardized sequence for reproducing video lines on a display screen, comprising:

a display unit having a display screen for displaying a two-dimensional image represented within and by a pattern of video lines;

a central processing unit including an associated program store;

a randomly accessible image memory for storing said pattern of video lines as a corresponding pattern of lines of memory locations; and a control unit for controlling access to the image memory, for generating and issuing image memory addresses, each including an address portion designating a certain one of said lines of memory locations, and for addressing said display screen, and further comprising encoding means (29, 36, 41) for converting, in accordance with an encoding algorithm, a said address portion, designating a certain line of memory locations and included in a said memory address issued by said control unit, into another pseudorandom address portion designating another line of memory locations, and means (25) for supplying said pseudorandom address portions in sequence for control of the deflection perpendicular to said video lines as displayed on said display screen, whereby the sequence in video lines reproduced on said display screen is pseudorandomly different from said standardized sequence for reproducing video lines on a display screen.

2. A video terminal in accordance with claim 1, wherein an input side of said encoding means is coupled to a controllable switching device, for connecting the output of an address bus connected to said control unit in response to a read command signal to said encoding means input side, in order to transfer said address portions thereto and for connecting said address bus in response to a write command signal to an address input of the image memory, said encoding means being connected on its output side both to said address input of said image memory, and to a converting device for converting an address signal developed on the output side of said encoding means into analog form for addressing said display screen.

3. Video terminal in accordance with claim 1, wherein the control unit is adapted to supply column addresses, text line addresses ($r_i$) and screen line addresses ($l_i$), and the image memory is composed of a first part, memory positions of which can be addressed by text line addresses and column addresses supplied, and of a second part which is adapted to supply information from the first part and indicated by the column and text line addresses, in lines indicated by the relevant screen line addresses, and wherein said encoding means are adapted to encrypt each of the text line and screen line addresses ($r_i$ and $l_i$) supplied in said pseudorandom addresses ($r_u$, $l_u$) on the basis of which the first memory part and the second memory part can be addressed; and wherein a translator is provided, for delivery of a parameter value $G_u = r_u*(z_l-1) + l_u$, in which ($z_l-1$) is the number of the last image line of a text line, as indicated by the relevant text line address, in response to to said address ($r_u$, $l_u$) supplied to said translator, whereby the line written on the screen is determined by the parameter value $G_u$ delivered.

4. A video terminal as claimed in claim 1, wherein said encoding means, hereinafter referred to as first encoding means, during the process of reading image information into said image memory, is effectively coupled between said control unit and said image memory to cause the sequence of lines of memory locations to be pseudorandomly different from the sequence wherein the memory addresses are issued by said control unit; and wherein addressing circuitry associated with said display screen includes second encoding means which during the process of reading image information out from said image memory cause the sequence wherein addresses, each designating a video line on said display screen, are issued from said control unit, to be pseudorandomly changed in said second encoding means in accordance with an encoding algorithm which is the inverse of said first encoding algorithm of said encoding means.

* * * * *